United States Patent [19]

Mattia

[11] Patent Number: 5,123,987
[45] Date of Patent: Jun. 23, 1992

[54] METHOD OF PRODUCING AN AIR BLADDER FROM TWO UNCURED MEMBRANES

[75] Inventor: Louis F. Mattia, Freemont, Ind.

[73] Assignee: Cooper Tire & Rubber Company, Findlay, Ohio

[21] Appl. No.: 556,051

[22] Filed: Jul. 20, 1990

[51] Int. Cl.⁵ .................................. B29C 47/00
[52] U.S. Cl. ........................ 156/234; 156/230; 156/235; 156/236; 156/238; 156/247; 156/289; 156/290; 156/292; 156/308.6; 156/323
[58] Field of Search ........... 156/230, 234, 236, 236, 156/238, 247, 289, 290, 292, 308.6, 540, 323; 101/27

[56] References Cited

U.S. PATENT DOCUMENTS

| | | | |
|---|---|---|---|
| 1,970,802 | 8/1934 | Johnson | 156/292 |
| 2,051,849 | 8/1936 | Hanna | 156/289 |
| 2,381,074 | 8/1945 | Muller et al. | 156/289 |
| 2,732,882 | 1/1956 | Kuts | 156/289 |
| 2,992,674 | 7/1961 | Cunningham | 156/467 |
| 3,075,457 | 1/1963 | Worth | 101/27 |
| 3,120,177 | 2/1964 | Clark | 101/41 |
| 3,128,692 | 4/1964 | Talarico | 101/11 |
| 3,217,637 | 11/1965 | Worth | 101/25 |
| 3,217,638 | 11/1965 | Gottscho | 101/27 |
| 3,244,092 | 4/1966 | Gottscho et al. | 101/9 |
| 3,304,856 | 2/1967 | Birch | 101/27 |
| 3,366,042 | 1/1968 | Birch | 101/27 |
| 3,483,062 | 12/1969 | Madge | 156/401 |
| 4,048,913 | 9/1977 | Navi | 101/27 |
| 4,063,500 | 12/1977 | Abe | 101/27 |
| 4,196,662 | 4/1980 | Hsu | 101/27 |
| 4,225,374 | 9/1980 | Kaufmann | 156/23 S |
| 4,744,843 | 5/1988 | Lewis | 156/289 |
| 4,749,432 | 6/1988 | Ando et al. | 156/289 |
| 4,770,731 | 9/1988 | Ferguson | 156/289 |

Primary Examiner—Robert A. Dawson
Assistant Examiner—David Reifsnyder
Attorney, Agent, or Firm—Joseph G. Nauman

[57] ABSTRACT

An air bladder is formed by producing a foil imprint on an inner surface of a first uncured rubber sheet, by heat pressing the imprint from a hot roll leaf stamping tape to the sheet. The first sheet is delivered from a reel to the heat press via a driven roller and idler roller combination. The hot roll leaf stamping tape is delivered above the first sheet via a take up reel and idler roller combination. The heating press includes a heated platen having the contour of the desired imprint, such that the imprint takes on the shape of the heated platen. A second sheet of uncured rubber is laminated to the first sheet, with the second sheet laminated over the first sheet, thereby convering the imprint. The two sheets are vulcanized which cures the non-imprinted surfaces of the rubber sheets together, thereby forming an air pocket in the shape of the imprint between the two sheets.

10 Claims, 3 Drawing Sheets

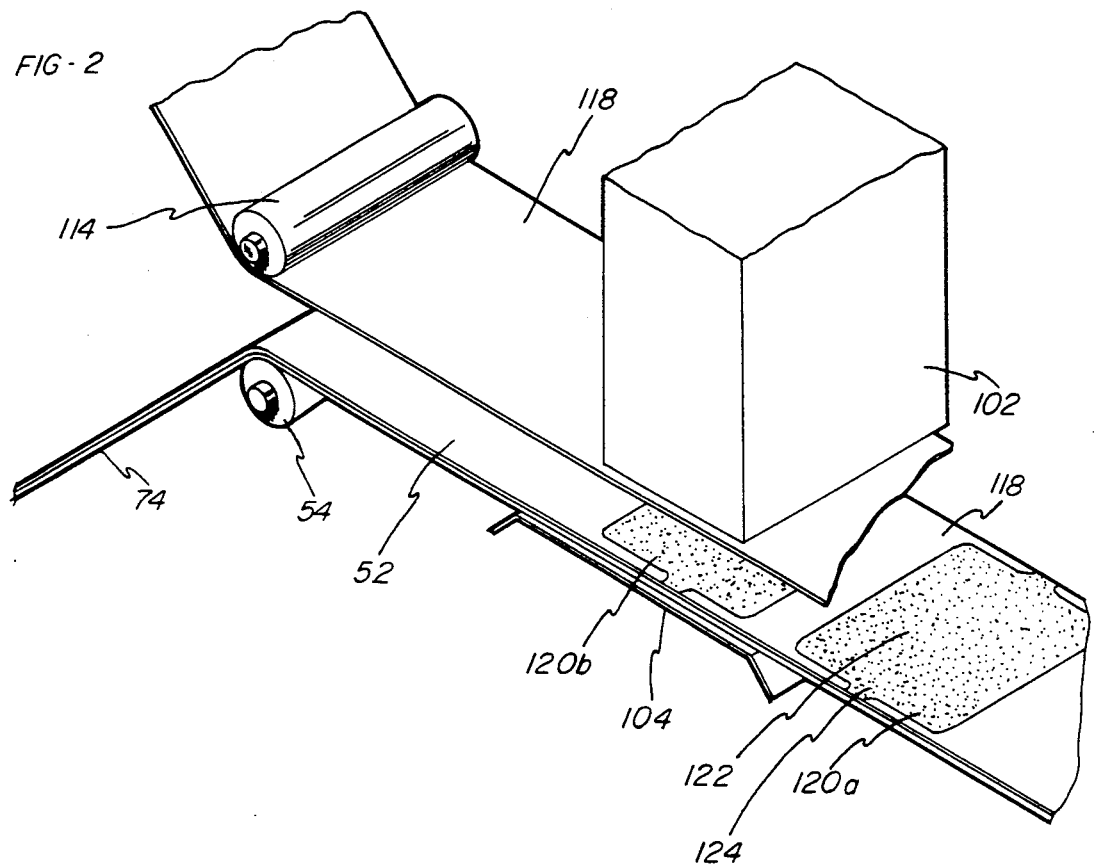
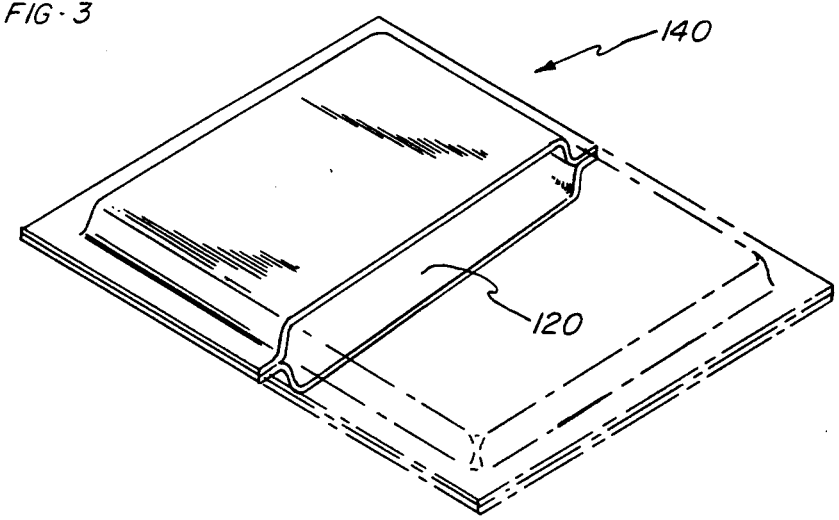

METHOD OF PRODUCING AN AIR BLADDER FROM TWO UNCURED MEMBRANES

BACKGROUND OF THE INVENTION

The subject invention relates to a method of producing air bags, and more particularly to a method of vulcanizing two sheets of unvulcanized rubber together, where a periphery only, is formed with a vulcanized seam, and where the center space between the two sheets of rubber forms an air bag, or bladder.

DESCRIPTION OF THE PRIOR ART

Air bags are presently produced and installed in automotive seats, in such areas as the back support, thigh area, headrest and bolster wings, where the air bags are inflatable to conform to, and support, the driver's or passenger's body contour. Such devices are typically referred to as lumbar supports. These types of seats are commonly equipped with a switch located along one exposed side of the seat whereby activation of the switch causes inflation of the air bag, vis-a-vis an electric motor and compressor combination.

One of the methods of producing these types of air bags includes placing two membranes of uncured medium, such as rubber, against each other, and curing the rubber sheets to form a peripheral seam, thereby forming an inflatable pocket between the membranes. The difficulty which has arisen in this technology has been localizing the curing and adhesion of the two membranes at one peripheral seam only, leaving the remaining opposed surfaces of the membranes unattached, to form the bag.

One early attempt to accomplish this purpose is shown in U.S. Pat. No. 1,970,802 where two sheets of rubber have a single sheet of paper placed between them to prevent the vulcanization of the central portion of the sheets. It should be understood that this paper is similarly configured as the sheets to be vulcanized, yet slightly smaller in profile, such that only the edges of the rubber sheets are vulcanized.

While this method has, in general, proven to be an acceptable method of producing an air bladder, the use of this method to produce an air bladder for an automotive seat air bag has proven to be unacceptable for various reasons. First, the paper tends to flutter within the bladder during the inflation and deflation thereof causing a disturbing noise to the consumer. Second, the vulcanization process causes the paper to ripple or wrinkle, and the heat of the vulcanization process also causes the rubber sheets to conform to the paper shape, thereby causing a rippling deformation to the outer sheets of rubber. This wrinkling of the rubber sheets causes an irregular air bag which could lead to an uncomfortable back support for the end user. Third, due to the moisture of the air within the bag, and due to the climate fluctuations of the air within the bag, the paper within the bladder tends to disintegrate into small pieces after numerous operations, and clogs the air valves which are provided for the bag's inflation and deflation. Fourth, this method of placing the paper on the rubber sheets must be done manually, and therefore leads to misalignment of the paper with respect to a longitudinal dimension. This misalignment of the paper sheets, then, requires that the shearing of the vulcanized rubber too, be done manually, because an automatic shearing device cannot reliably locate the bladder periphery due to the misaligned paper.

A need has arisen for an apparatus which can suitably apply or transfer a fixed impression or spacing means to one surface of an unvulcanized sheet of rubber, such that subsequent vulcanizing of a second sheet of rubber thereover, forms a bladder at the location of the spacing means. While in general, transferring of imprints to other surfaces is known, the process has not, heretofore, been suggested for the use in providing a barrier or spacing between two sheets of unvulcanized rubber to prepare a distinct pattern for an air pocket.

Reference is made to U.S. Pat. Nos. 3,075,457 and 3,217,637 which relate generally to the application of a marking or imprint in the form of a price, date-code or the like to a web of cellophane, or similar wrapping paper from a hot roll leaf stamping tape. The marking is made by placing the stamping tape, typically in the form of a foil tape, against the wrapping, using a heated die having raised type, and pressing the tape against the wrapping to be printed. This pressing heat transfers a foil imprint, in conformance with the raised type, from the hot roll leaf stamping tape to the cellophane.

SUMMARY OF THE INVENTION

The invention comprises producing an air bag from a process comprising the steps of supplying a first uncured medium, having a first and second side, into a heating press. A film which is impregnated with a heat transferable releasing agent is then supplied into the heating press adjacent to the second said side of the first medium. A heat press is provided which has a heated platen with a select profile. The film is heat pressed against the second said side of the first medium, thereby transferring a pattern onto the second said side of the first medium substantially similar to that of the profile of the heated platen. A second uncured medium is then supplied against the pattern on the second said side of the first medium and the first and second uncured mediums are vulcanized together in the proximity surrounding the pattern.

An apparatus for vulcanizing two sheets of uncured rubber together leaving an air pocket therebetween, in accordance with the above mentioned method comprises a heating press having first and second die platens. Means to supply a first medium of unvulcanized material to the press between the platens is also included. The apparatus also includes means to supply a film, having a heat transferable releasing agent thereon, to the press between one of the platens and one side of the first mediums. The apparatus also includes means to supply a second medium of vulcanized material against the one side of the first medium, and means to vulcanize the first and second said mediums together.

An object of the invention then is to design a method and apparatus for producing an air bag having a permanently fixed spacing means which will not distort, flutter or disintegrate, yet will provide the proper barrier between the sheets of rubber, such that the two rubber sheets will not vulcanize together during their vulcanization process; a further object of the invention is to design a method and an apparatus for producing an air bag, where the apparatus can apply the spacing means at predetermined longitudinal locations, such that after the spacing means is applied to the rubber sheet, the longitudinal dimension between consecutive spacing means is a given distance, such that automatic manufacturing and handling of the completed bladders is possible.

Other objects and advantages of the invention will be apparent from the following description, the accompanying drawings and the appended claims.

BRIEF DESCRIPTION OF THE DRAWINGS

FIG. 2 is diagrammatic view of the heat press showing the hot roll leaf tape disposed above the unvulcanized rubber sheet;

FIG. 3 is an isometric view of the finished air bladder, partially broken away to show the inner structure.

DETAILED DESCRIPTION OF THE PREFERRED EMBODIMENT

Figure 1:
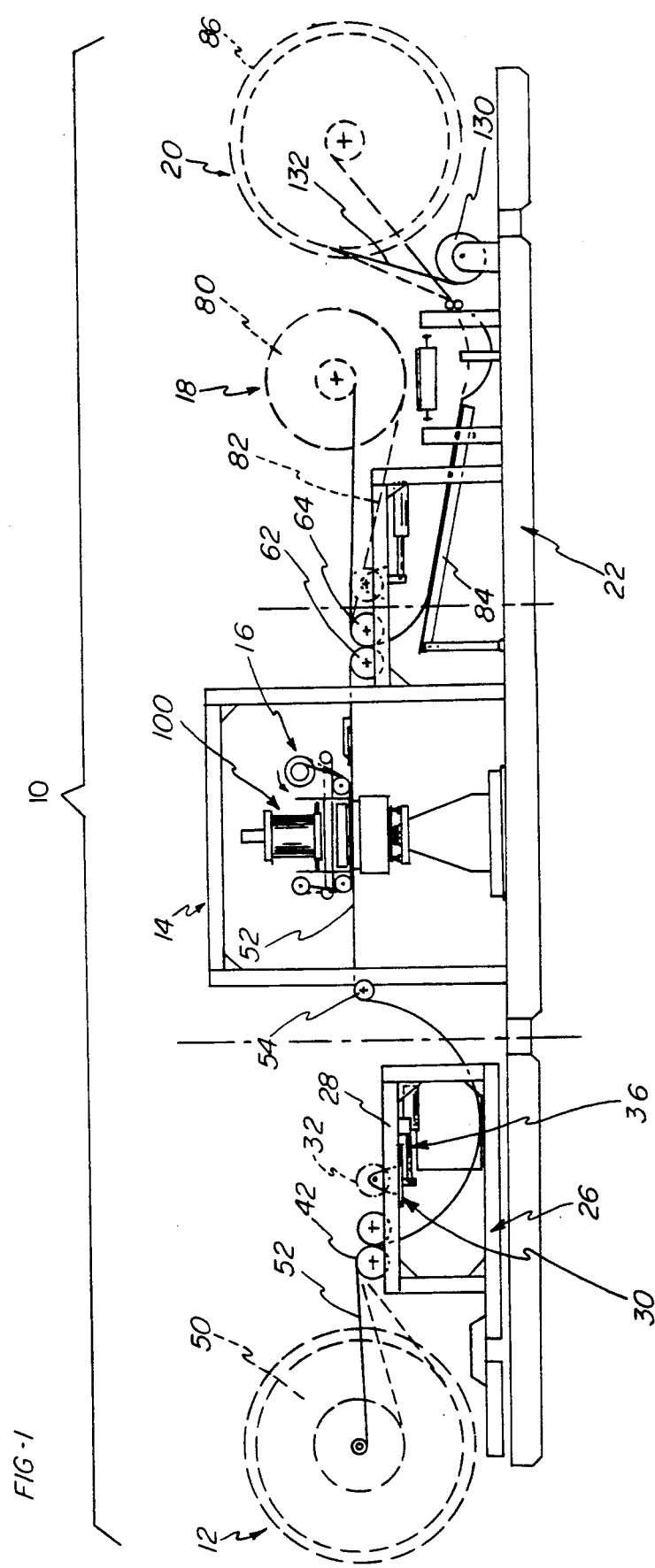
FIG. 1 is a side plan view of the apparatus of the instant invention.

With reference first to FIG. 1, the apparatus is generally designated as 10 and comprises a primary medium supply mechanism 12, a heat press apparatus 14, a hot roll leaf stamping tape supply mechanism 16, a second medium supply apparatus 18 and a take-up apparatus 20. It should also be noted from FIG. 1 that the entire apparatus is suitably mounted to a base portion 22 which will not be described in detail, but should be understood to include suitable structural support for such apparatus, such base including steel I-beams or girders with cross pieces welded or bolted to the I-beams to provide such structural integrity. The base 22 could also include plate steel bolted or welded across the tops of the I-beams to provide for mounting surfaces for the block bearings, motors, and the like.

With reference still to FIG. 1, the primary medium supply mechanism 12 generally comprises a reel 50 having rolled unvulcanized rubber sheet 52 which has been laminated with a sheet of polyethylene 74 (FIG. 4) to prevent tack between the adjacent layers of the unvulcanized material 52 on the reel 50. The mechanism 12 further comprises a driven roller 42 and an idler roller 32, the driven roller 42 being connected to a suitable driving means (not shown) such as a stepping motor or a dc servo motor. It should be understood that the driven roller 42 and the idler roller 32 are sufficiently forced together, to drive the sheet 52 upon driving the roller 42.

The idler roller 32 is mounted to a movable plate 30, the plate being movable towards and away from the driven roller 42 via cylinders 36, such movement being useful for initial feeding of the rubber sheet 52, or dislodging of the sheet if jammed. It should be noted that the idler roller 32 is shown in phantom in FIG. 1, in its rearwardmost position. It should be understood that conventional hardware such as block bearings (not shown) are used to mount the driven roller 42 to the upper portion 28 of the base 26, and also to mount the idler roller 32 to the movable plate 30.

Figure 4:
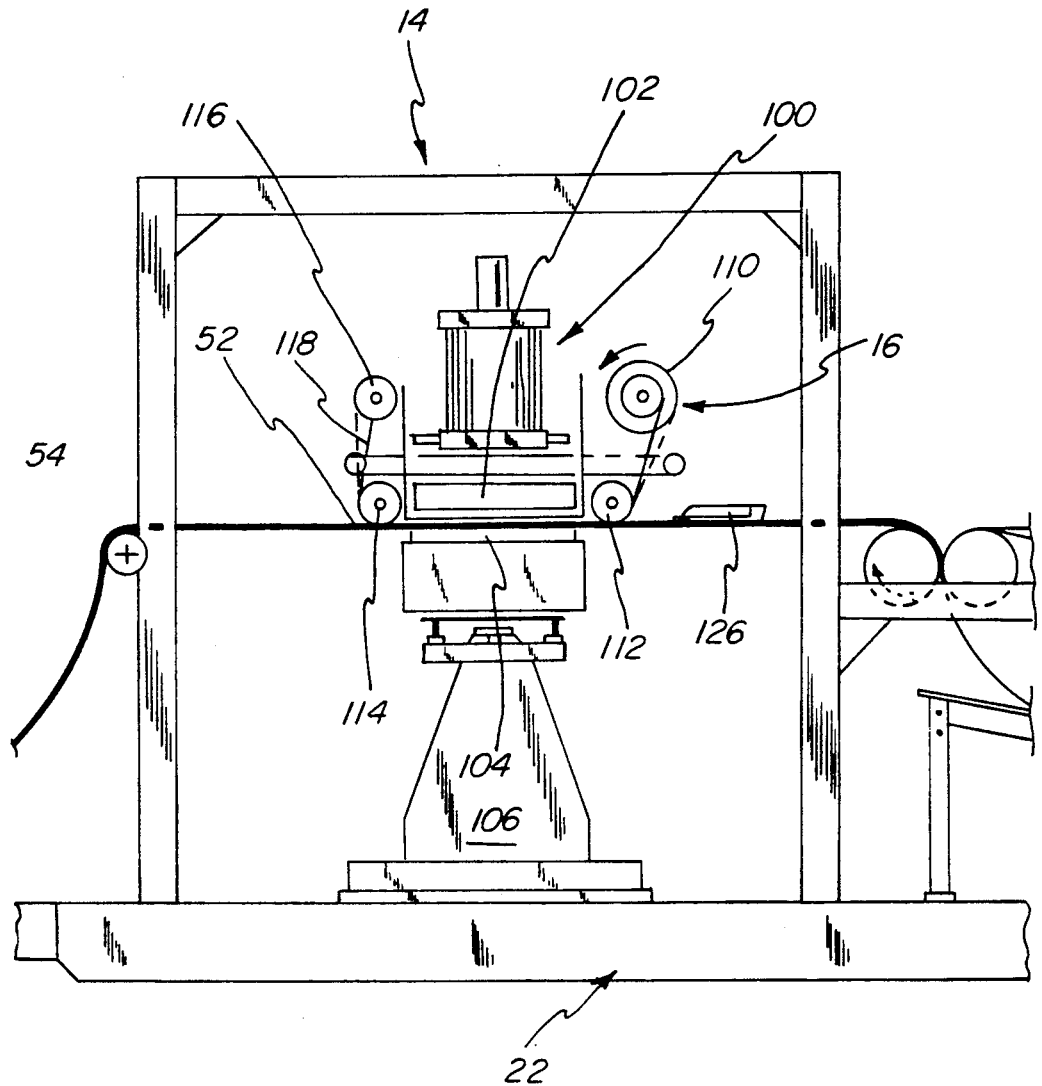
FIG. 4 is a view similar to that of FIG. 1, showing an exploded view of the heat transfer unit.

With reference now to FIG. 4, the heating press 100 generally comprises a base member 106 which fixedly mounts the press 100 to the base structure 22 of the assembly. The press 100 further includes a heating platen 102 and a lower support plate 104 which supports the unvulcanized material 52 during the heating or printing process.

The hot roll leaf stamping tape supply shown generally as 16 in FIG. 4 comprises foil tape 118, a supply reel 116, two idler rollers 114 and 112 and a driven take-up reel 110. It should be noted that, while not shown, the driven take-up reel 110 would be suitably driven by a stepping motor or a similar dc servo motor to provide intermittent delivery of the hot roll leaf stamping tape or foil tape 118 to a position beneath the heating platen 102, as shown diagrammatically in FIG. 2. An air directional table 126 is located adjacent to the idler roller 112 and above the unvulcanized sheet 52 which assists in the separation of the unvulcanized sheet 52 and the hot roll leaf stamping tape 118 after its heat stamping process.

With reference again to FIG. 1, the secondary supply reel 18 is shown as comprising a reel 80 having a second roll of unvulcanized sheet rubber 82 thereon which is delivered towards the driven roller 62 around the idler roller 64 where the first 52 and second 82 sheets of unvulcanized rubber are laminated together, pinched between the rollers 62 and 64.

The take-up apparatus 20 comprises a driven reel 86 to take up the laminated sheets of unvulcanized rubber 52 and 82. A reel 130 is included to deliver another sheet of polyethylene 132 between the adjacent layers of the unvulcanized laminated sheets 52 and 82 to prevent adhesion between the laminated sheets 52 and 82.

With reference to FIGS. 1 and 4, the operation of the apparatus 2 will be described in greater detail. It should first be understood that the heating press 100 will provide a heat released foil imprint on the upper surface of the unvulcanized sheet 52, in side-by-side longitudinal registration along the length of the unvulcanized sheet 52, for example such imprints as 120a and 120b, as shown in FIG. 2. These imprints are heat transferred from the foil tape 118 to the upper surface of the unvulcanized rubber sheet 52 by the process disclosed in U.S. Pat. Nos. 3,075,457 and 3,217,637, incorporated herein by reference.

With that in mind, the unvulcanized rubber sheet 52 is delivered to the heating press 100, together with the sheet of the polyethylene 74, as shown in FIG. 2. Both sheets 52 and 74 are fed over the idler roller 54, and between the rollers 62, 64. The sheets 52 and 74 are fed through the heating press 100, such that the polyethylene sheet 74 is above the lower support plate, yet below the hot roll leaf stamping tape 118.

A first foil imprint such as 120a (FIG. 2) is heat printed on the upper surface of the unvulcanized rubber sheet or medium 52, the medium 52 is transferred to the right, as viewed in FIG. 2, to shift and clear the printed imprint 120a on the sheet 52 from the heat transfer press 100. The rollers 42 and 62 are then simultaneously driven to transfer the imprint 120a to the right, as viewed in FIG. 2, to clear the imprint from the position beneath the heated platen 102. This delivers a new section of unvulcanized rubber sheet, that has not yet been imprinted, to a position beneath the heated platen 102.

At the same time, the driven foil take-up reel 110 (FIG. 4) is driven which provides for a new section of hot roll leaf stamping tape 118 over the new section of the unvulcanized sheet 52 to be printed. With the unvulcanized sheet 52 and the foil tape 118 in the proper registration, the heating press 100 is again activated which heat transfers another foil imprint 120b from the foil tape 118 to the upper surface of the unvulcanized sheet 52, as shown in FIG. 2. This heat imaging process is continued which places a plurality of imprints in longitudinal registration along the length of the unvulcanized rubber sheet.

In the best mode of the invention, conventional hot roll foil tape 118 including a heat transferable releasing agent is used, which tape can be purchased under the tradename FOILMARK. Also in the preferred embodiment of the invention, the heated platen 102 achieves a temperature of 280 degrees F., and the platen presses together the hot foil tape 118, and the uncured rubber sheet 52 for a time duration of 3 seconds, under a pressure of 80 psi.

It should be understood that as the driven roller 62 (FIG. 1) feeds the sheet 52 towards the right, as viewed in FIG. 1, the driven roller 62, in cooperation with the laminating roller 64, laminates sheet 52 and a second sheet of unvulcanized material 82 together with the foil imprint 120 sandwiched between the two unvulcanized sheets 52 and 82. The two sheets are then taken up on the driven take-up apparatus 20 with a further sheet of polyethylene 132 between the sheets for later processing of the two laminated sheets of unvulcanized material. Thus, the two unvulcanized sheets 52 and 82 are laminated together, with the foil imprint 120 therebetween, and with a sheet of polyethylene 74 on one side of the laminated sheets 52, 82, and a sheet of polyethylene 132 on the opposite side of the laminated sheets 52, 82.

While not explicitly shown, it should be understood that the apparatus 10 will include conventional control means which will provide for timed activation of the motors which drive the rollers and take up reels. Suffice it to say that the apparatus 10 includes control means which will simultaneously activate the drive rollers 42 and 62, to supply a section of the rubber sheet 52 beneath the heat press 102.

The apparatus 10 will also include control means which will activate the drive motor for the driven reel 110 (FIG. 4) to present the foil tape to a position beneath the heated platen 102. This activation can be simultaneous with the activation of the drive rollers 42 and 62, but it is not essential. Finally, the apparatus 10 includes control means which will drive the take up apparatus simultaneously with the driven rollers 42 and 62, which will allow the laminated sheets 52 and 82 to be reeled up simultaneously with the feeding of the sheets 52 and 82.

It should be understood that after the lamination process, the reel 86 is transferred to a vulcanizing station where the two sheets of polyethylene 74 and 132 are removed, and the two laminated sheets 52 and 82 are vulcanized or cured together to form an article bonded at positions exterior to the foil imprint. That is, the second sheet of rubber 82 will not bond to the imprint 120a or 120b during the vulcanization process which bonds the first and second sheets 52, 82 together. However, the two sheets 52 and 82 are completely sealed and bonded together around the periphery of the imprint 120a or 120b, thereby sealing the sheets together. This vulcanization process could be accomplished in either of two ways.

First, the entire reel 86, when completely full, could be transferred to the vulcanization station where the laminated sheets 52 and 82 is continuously fed into the vulcanization station, such that bladders are completed in a continuous roll or sheet. This sheet would later be transferred to a shearing station where the continuous sheet would be sheared into individual bladders.

Alternatively, the take up reel 86 could be immediately transferred to a shearing station where the laminated sheets are sheared into individual sections and then later transferred to the vulcanization station. In either event the finished product is the same.

It should also be understood that the take up station 20 is not entirely necessary. For example, the laminated sheets 52 and 82 could be transferred directly to the vulcanization station, and then to the shearing station; or in the alternative directly to the shearing station and then to the vulcanizing station. In this manner, the process would be completely continuous without the need for handling of the reel 86.

In the preferred embodiment of the invention, the imprint 120a or 120b is similar to that shown in FIG. 2, where the imprint includes a flat planar section 122 and a tab section 124. In the manufacture thereof, when the two sheets of rubber are vulcanized together, the upper sheet of unvulcanized rubber will not vulcanize to the imprint, which forms the pocket or void between the two sheets 52, 82. Furthermore, an opening will be formed along an outer periphery, at the tab section 124, which will provide for an opening, suitable for the insertion of an air valve therein, which can be bonded or sealed thereto via a suitable and conventional adhesive, or similar bonding process.

As shown in FIG. 3, an air bladder 140 is shown which was formed by the above-mentioned process, where the bladder 140 is shown partially broken away to show the internal structure. It should also be noted that the air bladder is shown in the inflated stage.

The above-mentioned method has been found to be quite advantageous in the manufacturing of air bladders for the automotive industry. As mentioned earlier, the previous method of making such articles included manually placing a sheet of paper on the upper surface of one of the sheets of unvulcanized material and then later placing a second sheet of unvulcanized rubber above both the first sheet and the paper, and vulcanizing the two sheets together with the paper therebetween. It should be understood that such manual placement of the paper on the upper surface of the first sheet results in misalignment of the paper sheets on the unvulcanized material. Thus, when the sheets are to be cut to finally form the air bladder, the sheets need to be cut manually in order to properly locate the seams relative to the inner paper sheet.

It should be understood that pursuant to this new inventive method, however, through the use of the fixed impregnation of the foil imprint on the upper surface of the unvulcanized first sheet, and through the use of precise control in the placement of the imprints on the first sheet, each of the imprints is in proper registration with other imprints such that the vulcanization and shearing of the finished product can be fully automated. That is, by always moving the medium 52 via the drive rollers 42 and 62 in specified increments, the centerline spacing between each of the imprints will be known, and more importantly will be equal. As mentioned above, this dimension is critical when determining the outer boundaries of the air bladders for the shearing of the vulcanized sheets 52 and 82 to form the individual air bladders.

It should also be understood that while the preferred embodiment of the above-mentioned method is for the provision of air bags for the automotive use, the invention should not be read so narrowly as to limit the scope of the claims to that use. For example, this method could be used for assembling two sheets of unvulcanized rubber together to form various configurations such as linear tubes, circular inner tubes, or such articles as complicated as a rubber raft having several separate and distinct longitudinal air bladders and a single horizontal pillow section.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of producing an air bag comprises the steps of:
   supplying a first uncured medium into a heating press, where the medium has a first and second side;
   supplying a film which is impregnated with a heat transferable releasing agent into the heating press adjacent to the second said side of the first medium;
   heat transferring the releasing agent from the film to the second said side of the first medium;
   supplying a second uncured medium and applying the second medium to the second side of the first uncured medium; and
   vulcanizing the first and second uncured mediums together to form an air bag having a void between the first and second uncured mediums.

2. The method of claim 1, wherein the film is supplied as a hot roll leaf stamping tape.

3. The method of claim 2, wherein the heat transferring step transfers a foil imprint from the film to the first medium.

4. The method of claim 1, wherein the first and second mediums are supplied as unvulcanized rubber sheets.

5. A method of producing an air pocket comprised of two rubber sheets, comprises the steps of:
   supplying a first uncured medium, having a first and second side, into a heating press;
   supplying a film which is impregnated with a heat transferable releasing agent into the heating press adjacent to the second said side of the first medium;
   providing a heat press having a heated platen with a select profile;
   heat pressing the film against the second said side of the first medium, thereby transferring an imprint onto the second said side of the first medium substantially similar to that of the profile of the heated platen;
   supplying a second uncured medium and applying it against the imprint on the second said side of the first medium; and
   vulcanizing the first and second uncured mediums together, whereby
   a void is created between the first and second mediums in the shape of the said select imprint.

6. The method of claim 5, wherein the heated platen is supplied as a flat continuous surface.

7. The method of claim 6, wherein the heated platen is supplied with a tab section jutting out from the flat continuous surface.

8. The method of claim 5, wherein the first and second sheets of medium are supplied as unvulcanized rubber.

9. The method of claim 8, wherein prior to vulcanizing the first and second sheets of medium together, the first and second sheets are laminated together.

10. The method of claim 9, wherein subsequent to the lamination step, the laminated sheets are rolled onto a takeup reel with a sheet of film between the adjacent laminated sheets to prevent the adhesion of the laminated sheets together.

* * * * *